United States Patent
Yun et al.

(10) Patent No.: US 8,819,325 B2
(45) Date of Patent: Aug. 26, 2014

(54) INTERFACE DEVICE AND SYSTEM INCLUDING THE SAME

(75) Inventors: Jae-Geun Yun, Hwaseong-Si (KR); Bub-Chul Jeong, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 263 days.

(21) Appl. No.: 13/368,353

(22) Filed: Feb. 8, 2012

(65) Prior Publication Data

US 2012/0210029 A1 Aug. 16, 2012

(30) Foreign Application Priority Data

Feb. 11, 2011 (KR) .......................... 10-2011-0012116

(51) Int. Cl.
*G06F 13/00* (2006.01)
(52) U.S. Cl.
USPC .............................. 710/310; 710/54; 710/110
(58) Field of Classification Search
CPC .......... G06F 5/10; H04L 49/90; H04L 49/901
USPC .................... 710/54, 110, 113, 240–244, 310
See application file for complete search history.

(56) References Cited

U.S. PATENT DOCUMENTS

| | | | | |
|---|---|---|---|---|
| 6,718,444 | B1* | 4/2004 | Hughes | 711/155 |
| 6,895,454 | B2* | 5/2005 | Barrick | 710/54 |
| 7,895,239 | B2* | 2/2011 | Wolrich et al. | 707/799 |
| 2007/0150688 | A1* | 6/2007 | Osborne et al. | 711/168 |
| 2008/0126622 | A1 | 5/2008 | Tamir et al. | |
| 2009/0063735 | A1* | 3/2009 | Ng et al. | 710/54 |
| 2011/0246688 | A1* | 10/2011 | Vaz et al. | 710/54 |
| 2013/0111084 | A1* | 5/2013 | Wang | 710/54 |

FOREIGN PATENT DOCUMENTS

| | | |
|---|---|---|
| JP | 2002-124950 | 4/2002 |
| KR | 1020060112349 A | 1/2006 |
| KR | 1020080025543 A | 3/2008 |

* cited by examiner

*Primary Examiner* — Glenn A Auve
(74) *Attorney, Agent, or Firm* — Volentine & Whitt, PLLC (57) ABSTRACT

An interface device includes a request queue and a request queue manager. The request queue includes multiple elements configured to receive corresponding requests from at least one master device and to indicate whether the corresponding requests are included using corresponding occupying bits. The request queue manager is configured to manage the request queue at least based on the occupying bits.

18 Claims, 12 Drawing Sheets

INTERFACE DEVICE AND SYSTEM INCLUDING THE SAME

CROSS-REFERENCE TO RELATED APPLICATION(S)

A claim of priority under 35 U.S.C. §119 is made to Korean Patent Application No. 10-2011-0012116, filed on Feb. 11, 2011, in the Korean Intellectual Property Office, the entire contents of which are hereby incorporated by reference.

BACKGROUND

Illustrative embodiments relate generally to data transmission, and more particularly relate to an interface device and a system including the same.

Due to convergence, according to which computers, communication devices, and other processing devices are becoming more highly integrated, the recent market trend is away from conventional application specific integrated circuits (ASICs) and application specific standard products (ASSPs), toward system-on-chip (SoC) technologies. In addition, miniaturization trends and high-performance requirements of information technology (IT) devices have factored into continuing development of the SoC industry.

Generally, SoC is a technology-intensive semiconductor field, which includes various complex functions in one chip. In developing SoC technology, interconnecting intelligent devices included in the chip has become an important consideration.

SUMMARY

Various illustrative embodiments provide an interface device capable of enhancing performance, and a system including the interface device.

According to various embodiments, an interface device includes a request queue and a request queue manager. The request queue includes multiple elements configured to receive corresponding requests from at least one master device and to indicate whether the corresponding requests are included using corresponding occupying bits. The request queue manager is configured to manage the request queue at least based on the occupying bits.

In various embodiments, when the request is a write request, the element designated by the request may store write data. When the request is a read request, data stored in a first element may be output, and the requests stored in elements other than the first element may be shifted to a next element.

In various embodiments, the request queue manager may swap at least part of items stored in the elements based on respective priorities of the requests.

The request queue manager may swap the items stored in first odd elements and adjacent even elements during a first cycle of a clock signal based on the priorities of the requests. The request queue manager may swap the items stored in the even elements and adjacent second odd elements during a second cycle of the clock signal based on the priorities of the requests.

The request queue manager may include first priority comparators configured to compare the priorities of the requests stored in the first odd elements and the adjacent even elements and to output first swapping signals based on the comparisons, the swapping signals determining whether the items stored in the first odd elements and the adjacent even elements are swapped. The request queue manager may further include second priority comparators configured to compare the priorities of the requests stored in the even elements and the adjacent second odd elements and to output second swapping signals based on the comparisons, the second swapping signals determining whether the items stored in the even elements and the adjacent second odd elements are swapped.

The items stored in at least one of the first odd elements and the adjacent even elements may be swapped in response to the first swapping signals, or the items stored in at least one of the even elements and the adjacent second odd elements may be swapped in response to the second swapping signals.

The items stored in the at least one of the first odd elements and the adjacent even elements may be swapped when the swapping signal has a second logic level. Alternatively, the items stored in the at least one of the first odd elements and the adjacent even elements may not be swapped when the swapping signal has a first logic level.

The first priority comparator may be configured to output the first swapping signals during the first cycle of the clock signal, and the second priority comparator may be configured to output the second swapping signals during the second cycle of the clock signal.

The request queue may correspond to a soft first-in first-out (FIFO) buffer, which includes the elements which are capable of being swapped with respect to each other.

In various embodiments, the request queue manager may be configured to provide a status signal indicating a state of the request queue based on the occupying bits.

According to various embodiments, a system includes master devices configured to transmit corresponding requests, slave devices, an interconnect device and slave interface devices. The interconnect device is configured to selectively connect the master devices and the slave devices with respect to each other. Each slave interface device is connected between one of the slave devices and the interconnect device, and is configured to process data transmitted between at least one of the master devices and the slave device. Each slave interface device includes a request queue and a request queue manager. The request queue includes elements configured to receive corresponding requests from at least one master device and to represent whether the corresponding requests are included using corresponding occupying bits. The request queue manager is configured to manage the request queue at least based on the occupying bits.

In various embodiments, the master devices and the slave devices may be installed in one chip.

In various embodiments, the interconnect device may include an arbiter configured to generate an arbitration signal based on the requests from the master devices, and a routing unit configured to select one of the requests in response to the arbitration signal. The arbiter may be configured to generate the arbitration signal according to a round robin schedule.

According to various embodiments, a slave interface device includes a request queue and a request queue manager. The request queue is connected to an interconnect for receiving requests from at least one master device through the interconnect, the request queue including multiple elements. Each element is configured to include a request from the at least one master device, an occupying bit indicating whether the request is included, and a priority indicating a priority of the request. The request queue manager is configured to manage the request queue at least based on the occupying bits and the priority of each of the elements.

According to various embodiments, the interface device and the system may increase QoS and operating frequency of the system by swapping items based on the priorities.

BRIEF DESCRIPTION OF THE DRAWINGS

Illustrative embodiments will be more clearly understood from the following detailed description taken in conjunction with the accompanying drawings.

DETAILED DESCRIPTION OF THE EMBODIMENTS

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms first, second, third, etc., may be used herein to describe various elements, these elements should not be limited by these terms. Rather, these terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. Further, terms such as those defined in commonly used dictionaries should be interpreted as having a meaning that is consistent with the context of the relevant art and will not be interpreted in an idealized or overly formal sense unless expressly so defined herein.

Figure 1:
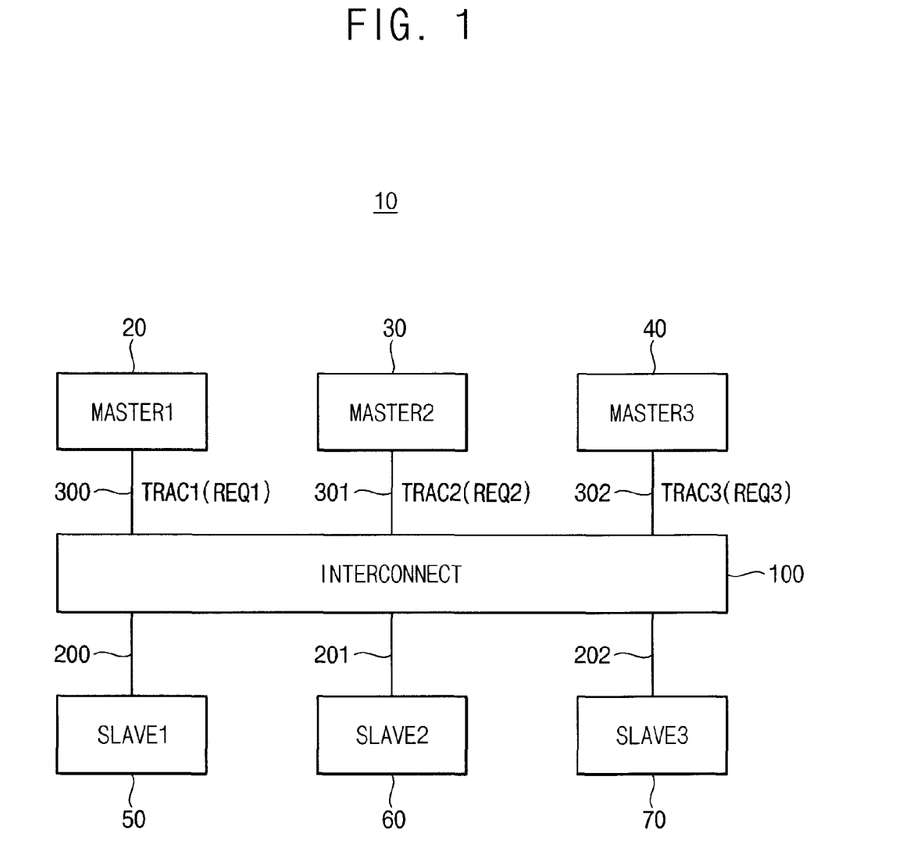
FIG. 1 is a block diagram showing a system, according to an illustrative embodiment.

FIG. 1 is a block diagram showing a system, according to illustrative embodiments.

Referring to FIG. 1, system 10 includes a first master device 20 (MASTER1), a second master device 30 (MASTER2), a third master device 40 (MASTER3), a first slave device 50 (SLAVE1), a second slave device 60 (SLAVE2), a third slave device 70 (SLAVE3) and an interconnect device 100 (INTERCONNECT). The master devices 20, 30, 40 are connected to the interconnect device 100 via master interface devices 300, 301, 302, respectively. Likewise, the slave devices 50, 60, 70 are connected to the interconnect device 100 via slave interface devices 200, 201, 202, respectively. Although the system 10 is shown as including three master devices 20, 30, 40 and three slave devices 50, 60 70, the number of the master devices and/or the slave devices may vary, without departing from the scope of the present teachings. The master interface devices 300, 301, 302 and the slave interface devices 200, 201, 202 may be actual devices (as opposed to wires), even though the master interface devices 300, 301, 302 and the slave interface devices 200, 201, 202 are depicted as lines for purposes of illustration. Each master device may be referred to as a master intellectual property (IP), and each slave device may be referred to as a slave IP. In various embodiments, the master devices 20, 30, 40 may be processors and the slave devices 50, 60, 70 may be memory devices, for example.

The first master device 20 may transmit a first transaction TRAC1 (or a first request REQ1) to the interconnect device 100, so that the first transaction TRAC1 is transmitted to at least one of the first through third slave devices 50, 60, 70. The second master device 30 may transmit a second transaction TRAC2 (or a second request REQ2) to the interconnect device 100, so that the second transaction TRAC2 is transmitted to at least one of the first through third slave devices 50, 60, 70. The third master device 40 may transmit a third transaction TRAC3 (or a third request REQ3) to the interconnect device 100, so that the third transaction TRAC3 is transmitted to at least one of the first through third slave devices 50, 60, 70. The first through third transactions TRAC1, TRAC2, TRAC3 may be request bursts or corresponding data bursts from the first through third master devices 20, 30, 40, respectively. Each of the first through third transactions TRAC1, TRAC2, TRAC3 may include accesses to at least one of the first through third slave devices 50, 60, 70.

Figure 2:
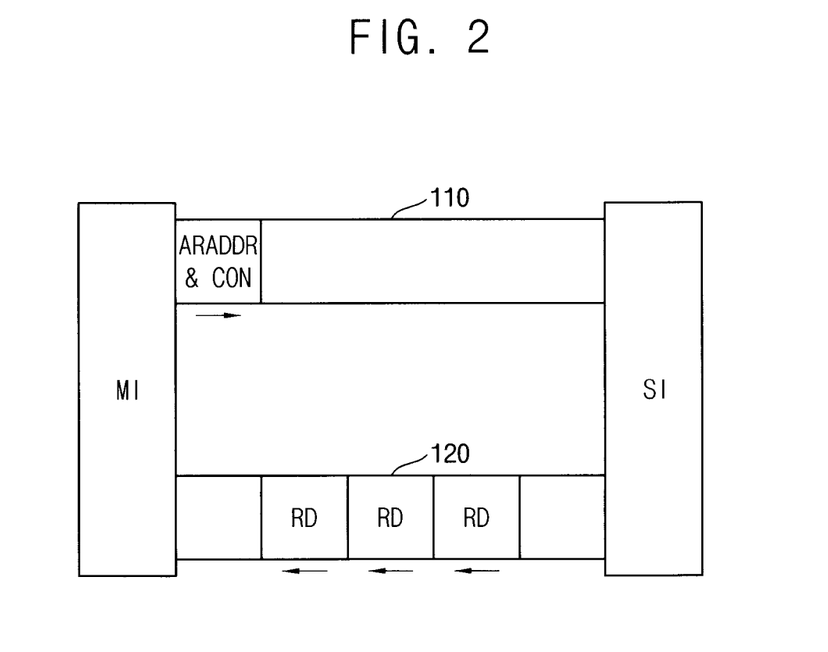
FIG. 2 is a functional block diagram showing the system of FIG. 1 performing a read operation, according to an illustrative embodiment.

FIG. 2 is a functional block diagram showing the system of FIG. 1 performing read operation, according to an illustrative embodiment.

Referring to FIG. 2, a master interface device MI transmits a read address ARADDR and a control signal CON to the slave interface device SI via a read address channel 110. In response to the read address ARADDR and the control signal CON, the slave interface device SI transmits read data RD to the master interface device MI via a read data channel 120. In other words, the system 10 of FIG. 1 may perform transactions via the read address channel 110 and the read data channel 120 in a read operation.

The master interface device MI may be one of the master interface devices 300, 301, 302 in FIG. 1. Likewise, the slave interface device SI may be one of the slave interface devices 200, 201, 202 in FIG. 1.

Figure 3:
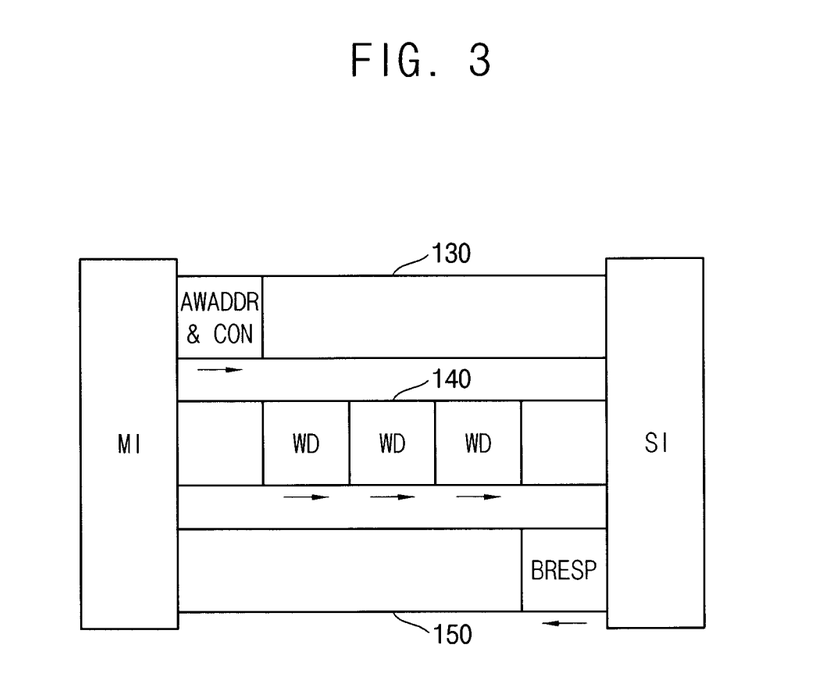
FIG. 3 is a diagram showing the system of FIG. 1 performing a write operation, according to an illustrative embodiment.

FIG. 3 is a functional block diagram showing the system of FIG. 1 performing a write operation, according to an illustrative embodiment.

Referring to FIG. 3, a master interface device MI transmits a write address AWADDR and a control signal CON to a slave interface device SI via a write address channel 130. The master interface device MI also transmits corresponding write data WD to the slave interface device SI via a write data channel 140. The slave interface device SI, which receives the write data WD, transmits a response signal BRESP to the master interface device MI via a write response channel 150. In other words, the system 10 of FIG. 1 may perform transactions via the write address channel 130, the write data channel 140 and the write response channel 150 in a write operation.

Figure 4:
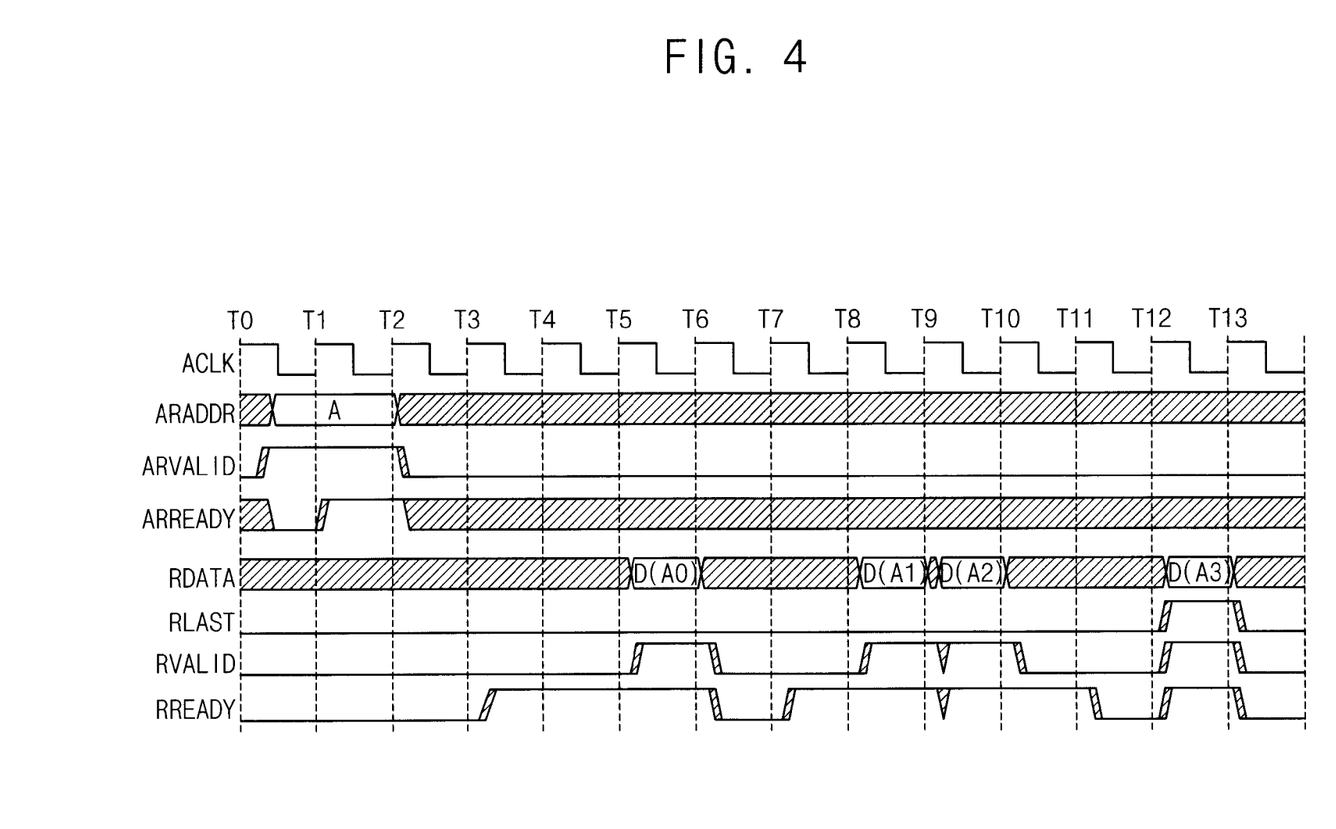
FIG. 4 is a timing diagram showing the read operation of FIG. 2, according to an illustrative embodiment.

FIG. 4 is a timing diagram showing the read operation of FIG. 2, according to an illustrative embodiment.

Referring to FIG. 4, a clock signal ACLK transitions from low level to high level at times T0~T13. In response to the falling edge of the clock signal ACLK (a half-period after the time T0), the read address signal ARADDR is transmitted from the master interface device MI to the slave interface device SI. During the transmission of the read address signal ARADDR from the master interface device MI to the slave interface device SI, a read address validity signal ARVALID, which is transmitted from the master interface device MI to the slave interface device SI, is maintained at high-level. The read address validity signal ARVALID indicates that the read address signal ARADDR is valid. During the transmission of the read address validity signal ARADDR from the master interface device MI to the slave interface device SI, a read address ready signal ARREADY is transmitted from the slave interface device SI to the master interface device MI. The read address ready signal ARREADY is maintained at low-level during one period, and then transitions to high-level during next period. The read address ready signal ARREADY indicates that the slave interface device SI is ready to receive the read address signal ARADDR.

Beginning at about a half-clock period after the time T5, read data RDATA is transmitted from the slave interface device SI to the master interface device MI. In other words, read data D(A0) corresponding to address A0, read data D(A1) corresponding to address A1, read data D(A2) corresponding to address A2, and read data D(A3) corresponding to address A3 are transmitted from the slave interface device SI to the master interface device MI. During transmission of the read data D(A3) from the slave interface device SI to the master interface device MI, a last read data signal RLAST, which is transmitted from the slave interface device SI to the master interface device MI, is maintained at high-level. The last read data signal RLAST indicates that the currently transmitted data is last. During the transmission of each of the read data D(A0), D(A1), D(A2), D(A3), a read data validity signal RVALID is maintained at high-level. A read data ready signal RREADY is also maintained at high-level, at least during the transmission of the read data D(A0), D(A1), D(A2), D(A3).

Figure 5:
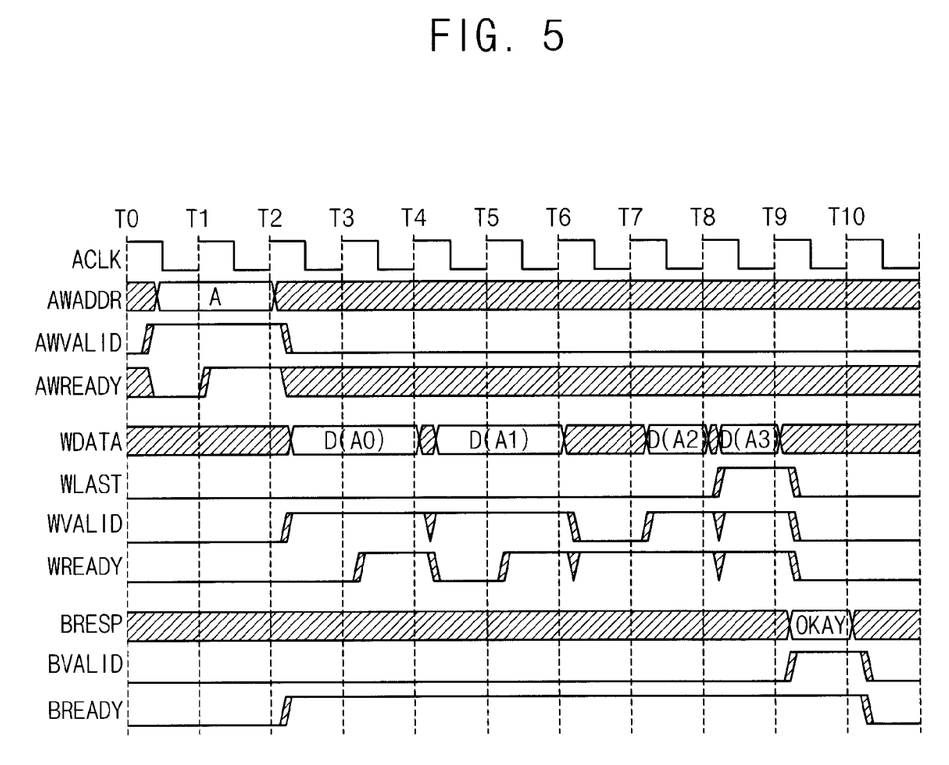
FIG. 5 is a timing diagram showing the write operation of FIG. 3, according to an illustrative embodiment.

FIG. 5 is a timing diagram showing the write operation of FIG. 3, according to an illustrative embodiment.

Referring to FIG. 5, a clock signal ACLK transitions from low level to high level at times T0~T13. In response to a falling edge of the clock signal ACLK (a half-period after the time T0), the write address signal AWADDR is transmitted from the master interface device MI to the slave interface device SI. During the transmission of the write address signal AWADDR from the master interface device MI to the slave interface device SI, a write address validity signal AWVALID, which is also transmitted from the master interface device MI to the slave interface device SI, is maintained at high-level. The write address validity signal AWVALID indicates that the write address signal AWADDR is valid. During the transmission of the write address validity signal AWADDR from the master interface device MI to the slave interface device SI, a write address ready signal AWREADY is transmitted from the slave interface device SI to the master interface device MI. The write address ready signal AWREADY is maintained at low-level during one period, and then transitions to high-level during next period. The write address ready signal AWREADY indicates that the slave interface device SI is ready to receive the write address signal AWADDR.

Beginning at time T2, write data WDATA is transmitted from the master interface device MI to the slave interface device SI. In other words, write data D(A0) corresponding to address A0, write data D(A1) corresponding to address A1, write data D(A2) corresponding to address A2, and write data D(A3) corresponding to address A3 are transmitted from the master interface device MI to the slave interface device SI. During transmission of the write data D(A3) from the master interface device MI to the slave interface device SI, a last write data signal WLAST, which is transmitted from the master interface device MI to the slave interface device SI, is maintained at high-level. The last write data signal WLAST indicates that the currently transmitted data is the last data to be transmitted. During the transmission of the write data D(A0), D(A1), D(A2), D(A3), a write data validity signal WVALID is maintained at high-level. In addition, a write data ready signal WREADY is maintained at high-level, at least during the transmission of the write data D(A0), D(A1), D(A2), D(A3). The write data ready signal WREADY indicates that the slave interface device SI is ready to receive the write data signal WDATA.

In addition, after the transmission of the last write data D(A3), the write data response signal BRESP, which is transmitted from the slave interface device SI to the master interface device MI, shows "OKAY" to indicate that the write data D(A0), D(A1), D(A2), DA(3) are properly transmitted. During the transmission of the "OKAY" signal, a response validity signal BVALID is maintained at high-level. During the transmission of the write data D(A0), D(A1), D(A2), D(A3), as well as the transmission of the "OKAY" signal, a response ready signal BREADY is maintained at high level.

The system 10 described with reference to FIGS. 1 to 5 supports burst transaction. One burst may include one to sixteen data transmissions. In other words, according to various embodiments, the number of data transmissions may be from one to sixteen in one burst.

Figure 6:
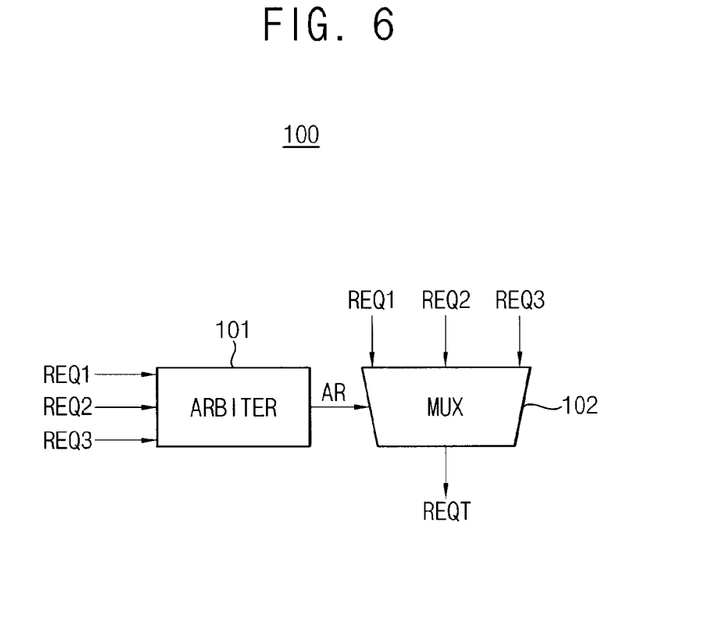
FIG. 6 is a block diagram showing an example of the interconnect device in FIG. 1, according to an illustrative embodiment.

FIG. 6 is a block diagram showing an example of the interconnect device in FIG. 1, according to illustrative embodiments.

Referring to FIG. 6, the interconnect device 100 includes an arbiter 101 and a routing unit 102 (MUX). The arbiter 101 receive first through third requests REQ1, REQ2 and REQ3, for example, and generates an arbitration signal AR based on the first through third requests REQ1, REQ2 and REQ3. In response to the arbitration signal AR, the routing unit 102 selects one of the first through third requests REQ1, REQ2 and REQ3 to provide a transaction request REQT.

The arbiter 101 may receive the first through third requests REQ1, REQ2 and REQ3 to generate the arbitration signal AR in accordance with a Round Robin schedule, for example, where the arbitration signal AR is generated such that the first through third requests REQ1, REQ2 and REQ3 are sequentially selected. In addition, the arbiter 101 may receive the first through third requests REQ1, REQ2 and REQ3 to generate the arbitration signal AR in accordance with a priority schedule, where each of the requests REQ1, REQ2 and REQ3 has corresponding priority. The arbitration signal AR may be generated so that the first through third requests REQ1, REQ2 and REQ3 are selected as the transaction request REQT based on the priorities. In various embodiments, the arbiter 101 and the routing unit 102 may be placed with respect to each of the slave interface devices 200, 201, 202. The requests REQ1, REQ2 and REQ3 may be sequential transactions, when the arbiter 101 and the routing unit 102 are placed with respect to each of the slave interface devices 200, 201, 202 and the requests REQ1, REQ2 and REQ3 require access to the same slave device.

The system 10 of FIG. 1 may use AXI protocol, in which case the system may include multiple outstanding address functions and data interleaving functions. According to the outstanding address functions, when information is provided through an address line and a data line of a bus (channel), each address of the data is transmitted only once through the address line in parallel with the data transmission. Therefore, unoccupied terms between addresses may be used. According to the data interleaving functions, when multiple master devices transmit data to one slave device, the data is mixed at slave device's end. Therefore, bandwidth may be used more efficiently.

Figure 7:
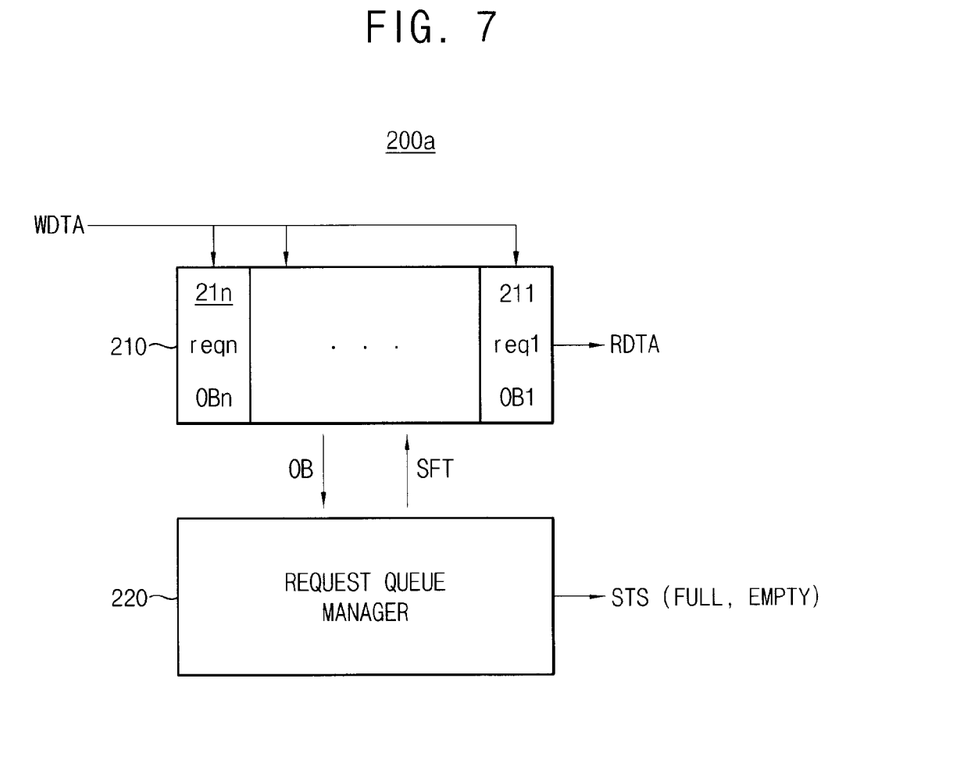
FIG. 7 is a block diagram showing an example of a slave interface device in FIG. 1, according to an illustrative embodiment.

FIG. 7 is a block diagram showing an example of the slave interface device in FIG. 1, according to an illustrative embodiment. Slave interface device 200a of FIG. 7 may be one of the slave interface devices 200, 201 and 202 in FIG. 1.

Referring to FIG. 7, the slave interface device 200a includes a request queue 210 and a request queue manager 220. The request queue 210 includes elements 211~21n, which may contain requests req1~reqn from the master devices in FIG. 1. The elements 211~21n represent whether the corresponding requests req1~reqn are contained using occupying bits OB1~OBn, respectively. For example, when one of the elements 211~21n includes the request req1~reqn, the corresponding occupying bit OB1~OBn may have a high level, and when one of the elements 211~21n does not include the request req1~reqn, the corresponding occupying bit OB1~OBn may have a low level. The request queue manager 220 changes the logic levels of the occupying bits OB1~OBn based on whether the corresponding elements 211~21n include requests req1~reqn, respectively. The requests req1~reqn may be stored in the elements 211~21n as type, ID and bank. The type of request indicates whether the request is a write request or a read request. The ID of the request denotes the address designating the request in detail. The ID of the request may be an index, such as a pointer, in an address buffer including the address, as opposed to the address itself. The bank of the request represents the bank of memory to which the designated address belongs.

The request queue manager 220 manages the request queue 210 at least based on the occupying bits OB1~OBn. For example, the request queue manager 220 may externally provide a status signal STS indicating state of the request queue 210. The requests req1~reqn may be sequentially stored in the elements 211~21n in order from the element 211 to the element 21n. For example, when occupying bit OB1 of the element 211 is a low level, indicating that corresponding request is not stored in the element 211, the request queue manager 220 may externally provide status signal STS (EMPTY), indicating the element 211 is empty. When the elements 211~21n store corresponding requests, the request queue manager 220 may externally provide status signal STS (FULL), indicating the elements 211~21n are full.

When a request is a write request, corresponding write data WDTA may be stored in parallel in the elements designated by the ID of the write request. When a request is a read request, data stored in the first element 211 is output as read data RDTA, and data stored in other elements are shifted to the next elements, e.g., in response to a shifting signal SFT applied to the request queue 210 by the request queue manager 220.

Figure 8:
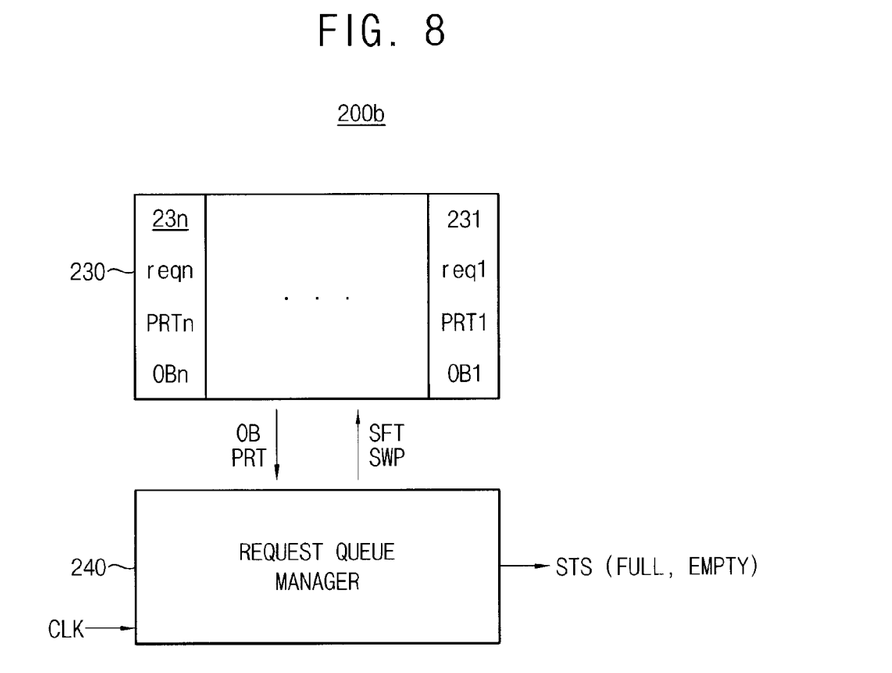
FIG. 8 is a block diagram showing another example of a slave interface device in FIG. 1, according to an illustrative embodiment.

FIG. 8 is a block diagram showing another example of the slave interface device in FIG. 1, according to an illustrative embodiment. Slave interface device 200b of FIG. 8 may be one of the slave interface devices 200, 201 and 202 in FIG. 1.

Referring to FIG. 8, the slave interface device 200b includes a request queue 230 and a request queue manager 240. The request queue 230 includes elements 231~23n, which may contain requests req1~reqn from the master devices in FIG. 1, respectively. The elements 231~23n represent whether the corresponding requests req1~reqn are contained using occupying bits OB1~OBn, respectively. In addition, the elements 231~23n include priorities PRT1~PRTn, which are associated with the corresponding requests req1~reqn, respectively. For example, when one of the elements 231~23n includes the request req1~reqn, the corresponding occupying bit OB1~OBn may have a high level, and when one of the elements 231~23n does not occupy the request req1~reqn, the corresponding occupying bit OB1~OBn may have a low level. The request queue manager 230 changes the logic level of the occupying bits OB1~OBn based on whether the corresponding elements 231~23n include corresponding requests req1~reqn, respectively. The requests req1~reqn may be stored in the elements 231~23n as type, ID and bank, as discussed above.

The request queue manager 240 manages the request queue 230 based on the occupying bits OB1~OBn and the priorities PRT1~PRTn. The request queue manager 240 in FIG. 8 may perform substantially the same operation of the request queue manager 220 in FIG. 7 based on the occupying bits OB1~OBn. In addition, the request queue manager 240 is configured to swap at least parts of items, including each request req1~reqn, each priority PRT1~PRTn and each occupying bit OB1~OBn and data and/or other information, stored in each of the elements 231~23n based on the priorities PRT1~PRTn, where n is an even number greater than or equal to two.

The request queue manager 240 divides clock signal CLK for swapping items stored in the elements 231~23n based on the priorities PRT1~PRTn. For example, the request queue manager 240 may swap items stored in first odd elements 231, 233, ..., 23(n−1) and adjacent even elements 232, 234, ..., 23n with respect to each other during a first cycle of the clock signal CLK (i.e., during odd clock cycles) based on the priorities PRT1~PRTn, and may swap items stored in even elements 232, 234, ..., 23n and adjacent second odd elements 233, ..., 23(n−1) with respect to each other during a second cycle of the clock signal CLK (i.e., during even clock cycles) based on the priorities PRT1~PRTn. For these swapping operations, the request queue manager 240 includes multiple priority comparators.

Figure 9A:
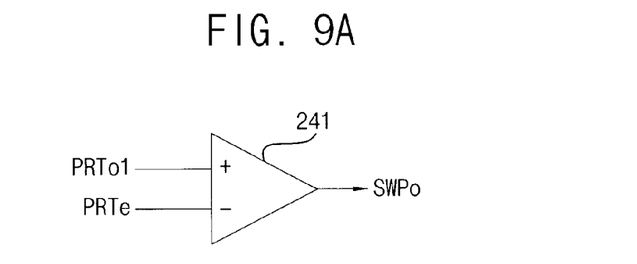
FIGS. 9A and 9B are block diagrams respectively showing priority comparators, according to illustrative embodiments.
Figure 9B:
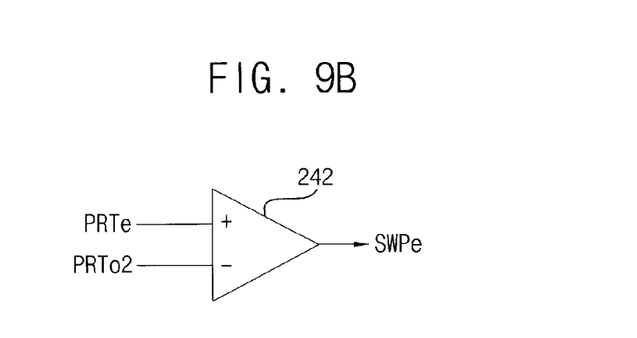

FIGS. 9A and 9B are block diagrams respectively showing priority comparators of the queue manager 240, according to illustrative embodiments.

FIG. 9A shows a priority comparator of the request queue manager 240 comparing the priorities PRT1~PRTn of the requests stored in adjacent first odd elements 231, 233, ..., 23(n−1) and even elements 232, 234, ..., 23n with respect to each other during the first cycle of the clock signal CLK (i.e., during odd clock cycles).

Referring to FIG. 9A, priority comparator 241 compares a priority PRTo1 of the request stored in one of the first odd elements 231, 233, ..., 23(n−1) and a priority PRTe of the request stored in one of the even elements 232, 234, ..., 23n adjacent to the one of the first odd elements 231, 233, ..., 23(n−1), respectively, to output an odd swapping signal SWPo having a logic level according to the stored priorities of the requests. The priority PRTo1 is input to a positive input terminal of the priority comparator 241 and the priority PRTe is input to a negative input terminal of the priority comparator 241. Therefore, the priority comparator 241 outputs an odd swapping signal SWPo having a first logic level (high level) when the priority PRTo1 of the request has a higher priority than the priority PRTe of the request. When the odd swapping signal SWPo has the first logic level, items stored in the first odd elements 231, 233, ..., 23(n−1) and the even elements 232, 234, ..., 23n are not swapped. When the odd swapping signal SWPo has the second logic level (low level), items stored in the first odd elements 231, 233, ..., 23(n−1) and the even elements 232, 234, ..., 23n are swapped with respect to each other.

FIG. 9B shows a priority comparator of the request queue manager 240 comparing the priorities PRT1~PRTn of the requests stored in adjacent even elements 232, 234, ..., 23n and second odd elements 233, ..., 23(n−1) with respect to each other during the second cycle of the clock signal CLK (i.e., during even clock cycles).

Referring to FIG. 9B, a priority comparator 242 compares the priority PRTe of the request stored in one of the even elements 232, 234, ..., 23n and a priority PRTo2 of the request stored in one of the second odd elements 233, ..., 23(n−1) adjacent to the even elements 232, 234, ..., 23n, respectively, to output an even swapping signal SWPe having a logic level according to the stored priorities of the requests. The priority PRTe is input to a positive input terminal of the priority comparator 242 and the priority PRTo2 is input to a negative input terminal of the priority comparator 242. Therefore, the priority comparator 242 outputs an even swapping signal SWPe having a first logic level (high level) when the priority PRTe of the request has a higher priority than the priority PRTo2 of the request. When the even swapping signal SWPe has the first logic level, items stored in the even elements 232, 234, ..., 23n and the second odd elements 233, ..., 23(n−1) are not swapped. When the even swapping signal SWPe has the second logic level (low level), items stored in the even elements 232, 234, ..., 23n and the second odd elements 233, ..., 23(n−1) are swapped with respect to each other.

Figure 9C:
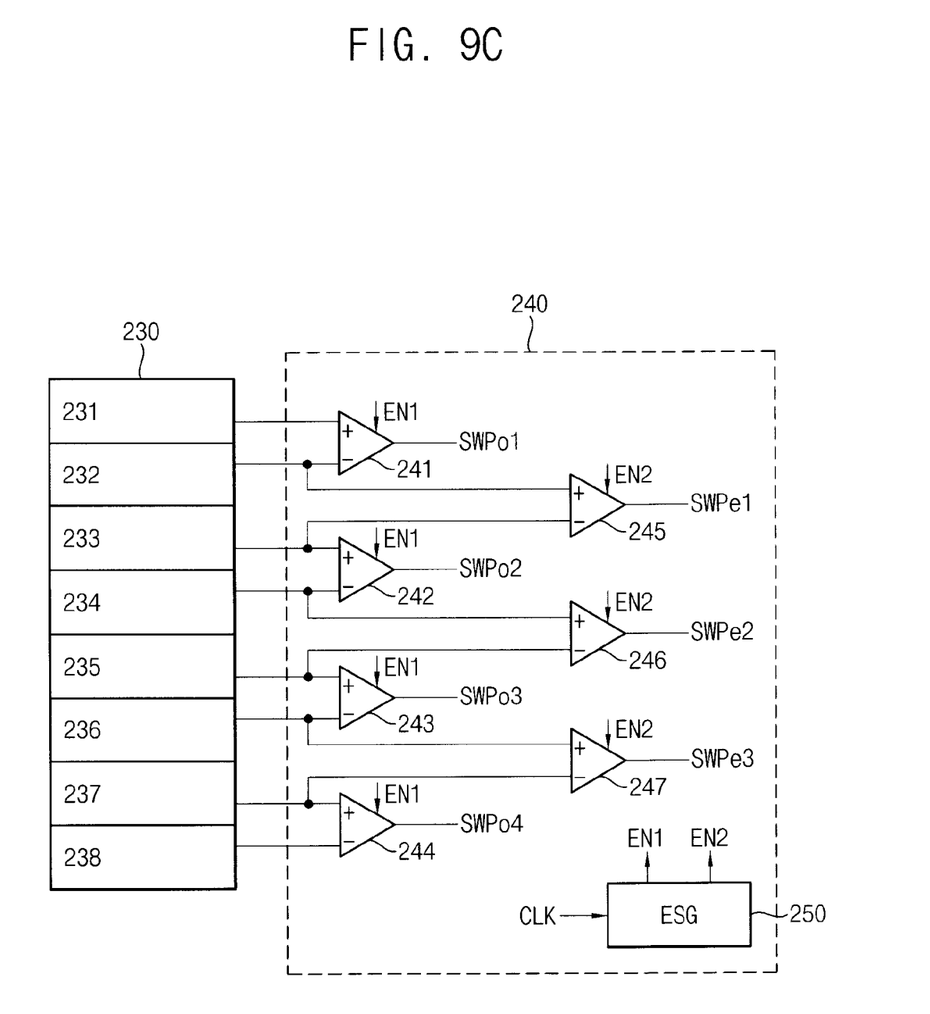
FIG. 9C is a block diagram showing a request queue and a request queue manager of FIG. 8, according to illustrative embodiments.

FIG. 9C is a block diagram showing the request queue and the request queue manager of FIG. 8, according to illustrative embodiments. In FIG. 9C, the request queue 230 includes eight elements 231~238, for example.

Accordingly, referring to FIG. 9C, the request queue manager 240 includes priority comparators 241~247 and an enable signal generator (ESG) 250. The ESG 250 generates first and second enable signals EN1 and EN2 based on the clock signal CLK. The first enable signal EN1 is activated during the first (odd) cycles of the clock signal CLK, and is applied to the priority comparators 241~244. The second enable signal EN2 is activated during the second (even) cycles of the clock signal CLK, and is applied to the priority comparators 245~247. Thus, the priority comparators 241~244 are enabled during the first cycles of the clock signal CLK, where the priority comparators 241~244 compare priorities of the requests stored in adjacent elements 231 and 232, 233 and 234, 235 and 236, and 237 and 238, respectively, and output each of the odd swapping signals SWPo1~SWPo4 based on the stored priorities of the requests. Each set of adjacent elements 231 and 232, 233 and 234, 235 and 236, and 237 and 238 maintain or swap corresponding items according to the odd swapping signals SWPo1~SWPo4. Likewise, the priority comparators 245~247 are enabled during the second cycles of the clock signal CLK, where the priority comparators 245~247 compare priorities of the requests stored in adjacent elements 232 and 233, 234 and 235, and 236 and 237, respectively, and output each of the even swapping signals SWPe1~SWPe3 based on the stored priorities of the requests. Each set of adjacent elements 232 and 233, 234 and 235, 236 and 237 maintain or swap corresponding items according to the even swapping signals SWPe1~SWPe3. When the request queue 230 includes n elements 231~23n, the request queue manager 240 is implemented with (n−1) priority comparators.

Figure 10:
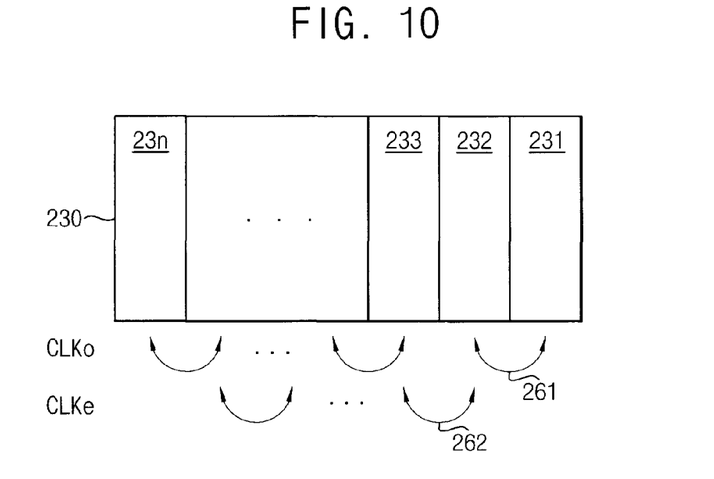
FIG. 10 is a diagram showing items in elements of the request queue being swapped, according to illustrative embodiments.

FIG. 10 shows that items in the elements of the request queue are swapped, according to illustrative embodiments. In FIG. 10, each of the priorities PRT1~PRTn of the requests req1~reqn stored in each of the elements 231~23n has a priority in ascending order.

Referring to FIG. 10, the items stored in the first odd elements 231, 233, ..., 23(n−1) and the respectively adjacent even elements 232, 234, ..., 23n are swapped with respect to each other in operation 261 during a first cycle CLKo of the clock signal CLK, and the items stored in the even elements 232, 234, ..., 23n and the respectively adjacent second odd elements 233, ..., 23(n−1) are swapped with respect to each other in operation 262 during a second cycle CLKe of the clock signal CLK. When the items in the elements 231~23n are swapped as illustrated in FIG. 10, the ith item stored in the ith element 23i may receive data from adjacent (i−1)th item and/or (i+1)th item.

Accordingly, the items in the elements of the request queue may be swapped based on the priorities of the requests according to various embodiments, and the request queue may be a soft first-in first-out (FIFO) buffer.

Figure 11:
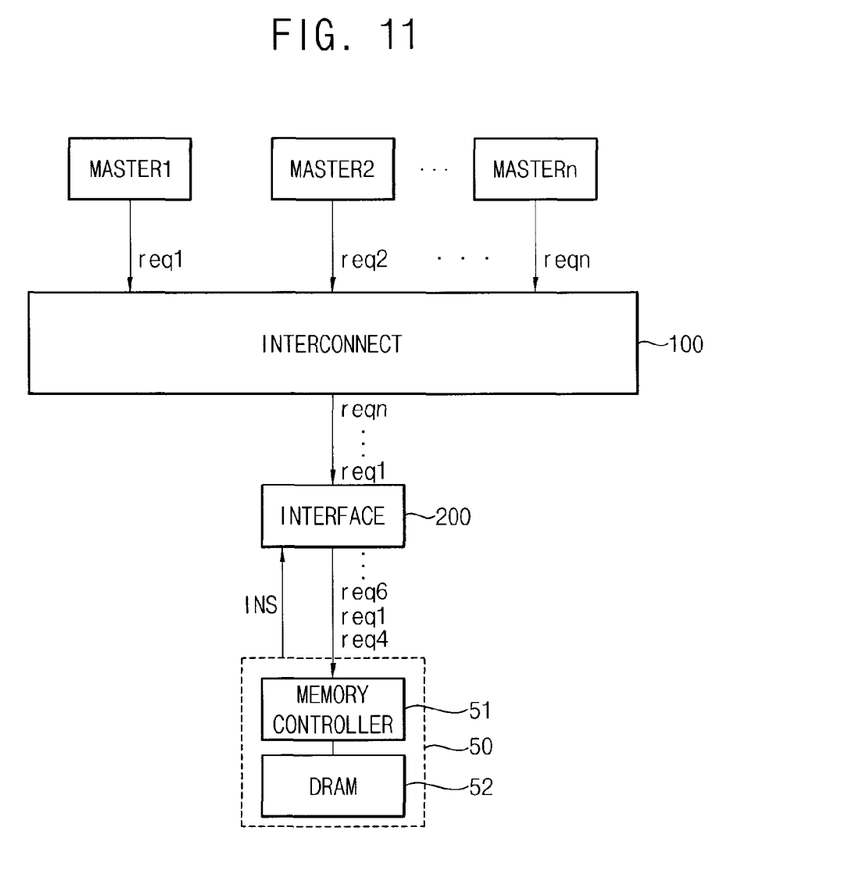
FIG. 11 is a block diagram showing multiple requests focused on one slave device in FIG. 1, according to an illustrative embodiment.

FIG. 11 is a block diagram showing a configuration in which multiple requests are focused on one slave device as shown in FIG. 1, according to an illustrative embodiment. In FIG. 11, the priorities PRT1~PRTn of the requests req1~reqn stored in the elements 231~23n, respectively, have priorities in ascending order.

Referring to FIG. 11, the interconnect device 100 arbitrates the requests req1~reqn from the master devices MASTER1~MASTERn, and the requests req1~reqn are input to the slave interface device 200 in ascending order. The slave interface device 200 swaps the items based on the priorities of the requests req1~reqn to provide the slave device 50 with the requests req4, req1, req6, . . . in an order of the requests req4, req1, req6 . . . . The slave device 50 may be a memory sub-system including a memory controller 51 and a memory device 52, such as DRAM. The memory controller 51 accesses the memory device 52 and performs required operations according to the order of the requests req4, req1, req6 . . . . The memory controller 51 provides the slave interface device 200 with an information signal INS indicating a state of the memory device 52. Accordingly, the slave interface device 200 arbitrates the requests accessed to the memory controller 51 as a soft buffer according to the priorities, and the frequency of request arbitration may be increased. Therefore, a request having a higher priority is executed prior to a request having a lower priority, and thus Quality of Service (QoS) based on the priorities is provided.

With reference to FIGS. 8 to 11, the clock signal CLK is divided into first clock cycles and second clock cycles. However, in alternative embodiments, the clock signal CLK may be divided into m clock cycles, where m is greater than two.

FIGS. 12A, 12B, 12C and 12D are block diagrams showing a structure of packets transmitted through the channels in FIGS. 2 and 3, according to an illustrative embodiment. In the example shown in FIGS. 12A, 12B, 12C and 12D, the packets are described with respect to eight master devices and eight slave devices, respectively.

Figure 12A:
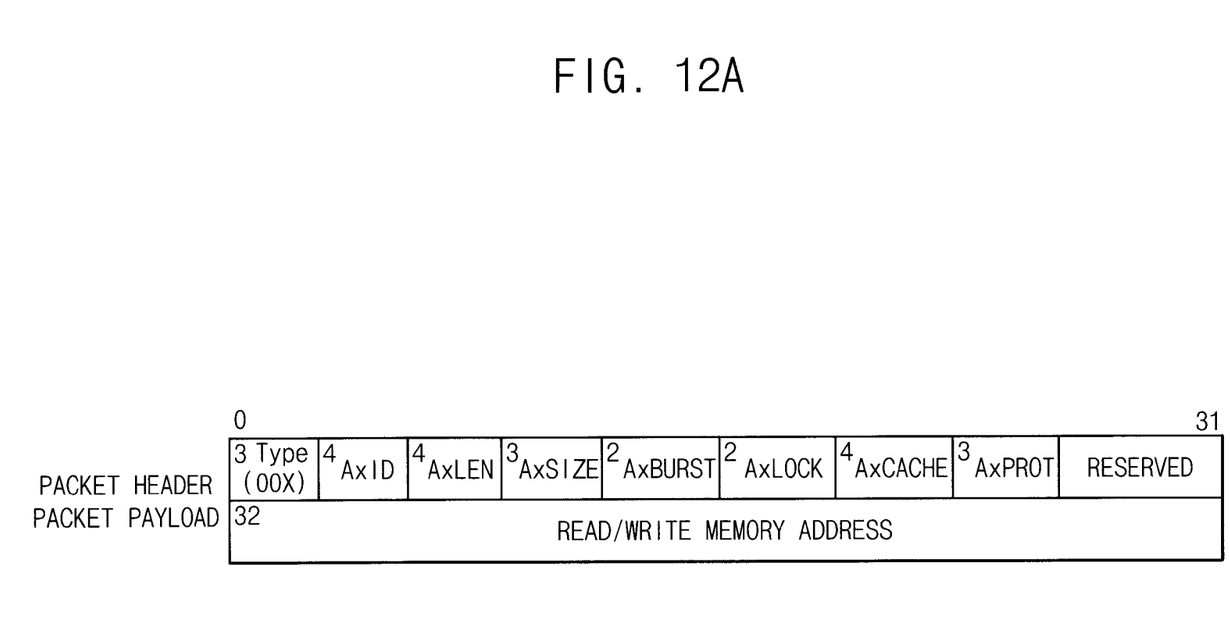
FIGS. 12A, 12B, 12C and 12D are block diagrams showing examples of a structure of packets transmitted through channels in FIGS. 2 and 3, according to an illustrative embodiment.

FIG. 12A shows a structure of a read request packet or a write request packet, which is transmitted through the read address channel 110 or the write address channel 130, respectively, according to an illustrative embodiment. The structures of the read request packet and the write request packet may have common structure, as shown.

Referring to FIG. 12A, the packet header includes information regarding packet type Type, transmitter ID AxID, data length AxLEN, data size AxSIZE, data type AxBURST, lock setting information AxLOCK, usage of cache memory AxCACHE, and security level AxPROT. In addition, the packet payload includes the read memory address or the write memory address. The packet type (Type) indicates one of the read request packet or the write request packet (or a read packet, a write packet or a write response packet, as discussed with reference to FIGS. 12B-12D). The lock setting information AxLOCK indicates whether the lock is set so that only a particular AXI master or AXI slave receives the packets. The usage of cache memory AxCACHE indicates whether cache memory is capable of being used. The security level AxPROT indicates whether the packet should be protected, and indicates security level for protection of the packet. The data length AxLEN indicates burst length, which means the amount of data transmission in one burst. The data length AxLEN may indicate 1 to 16, for example, according to various embodiments. The data size AxSIZE indicates the maximum data byte capable of being contained in each data transmission of the burst. The data size may be 1, 2, 4, 8, 16, 32, 64 or 128 bytes, for example, according to various embodiments.

Figure 12B:
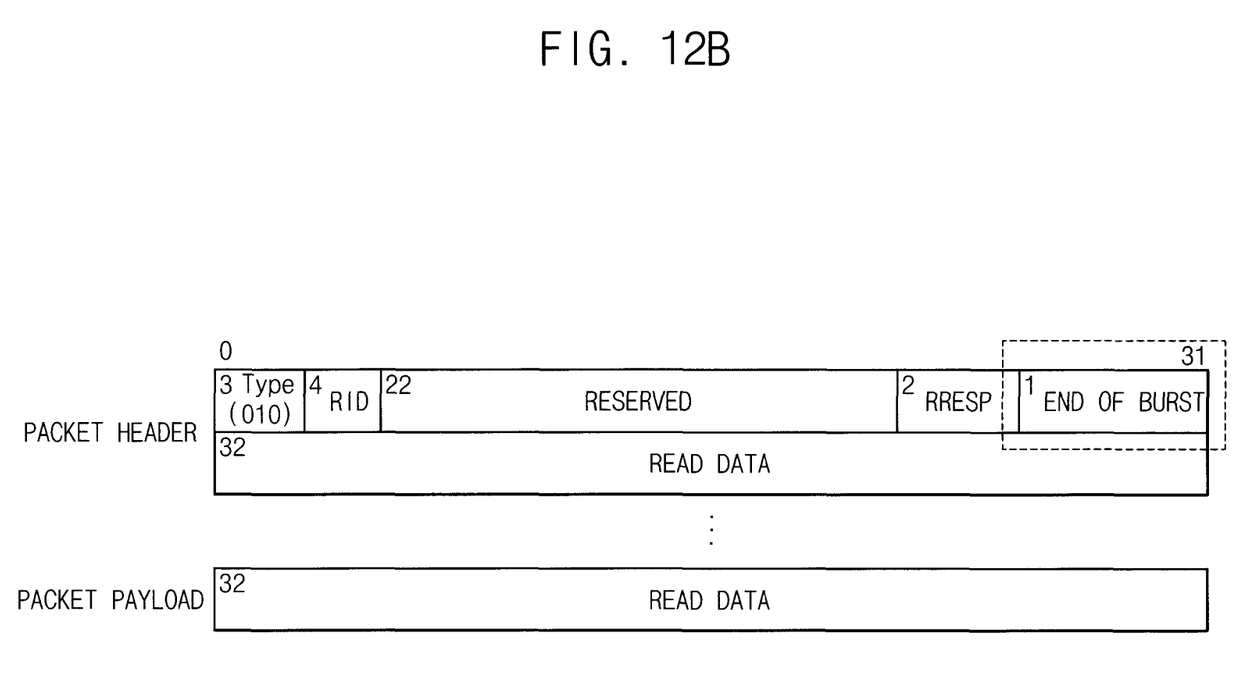

FIG. 12B shows a structure of a read data packet transmitted through the read data channel 120 in FIG. 2, according to an illustrative embodiment.

Referring to FIG. 12B, the packet header includes information regarding packet type Type, identification of a slave device which is the object of the read operation (RID) in response to a request of a master device, information relating to whether the requested read packet is transmitted normally (RRESP), and information relating to whether the burst is the last burst (END OF BURST). More particularly, RRESP indicates whether the read request packet has been normally transmitted, whether a slave error has occurred, and whether an address error has occurred. The packet payload includes read data.

Figure 12C:
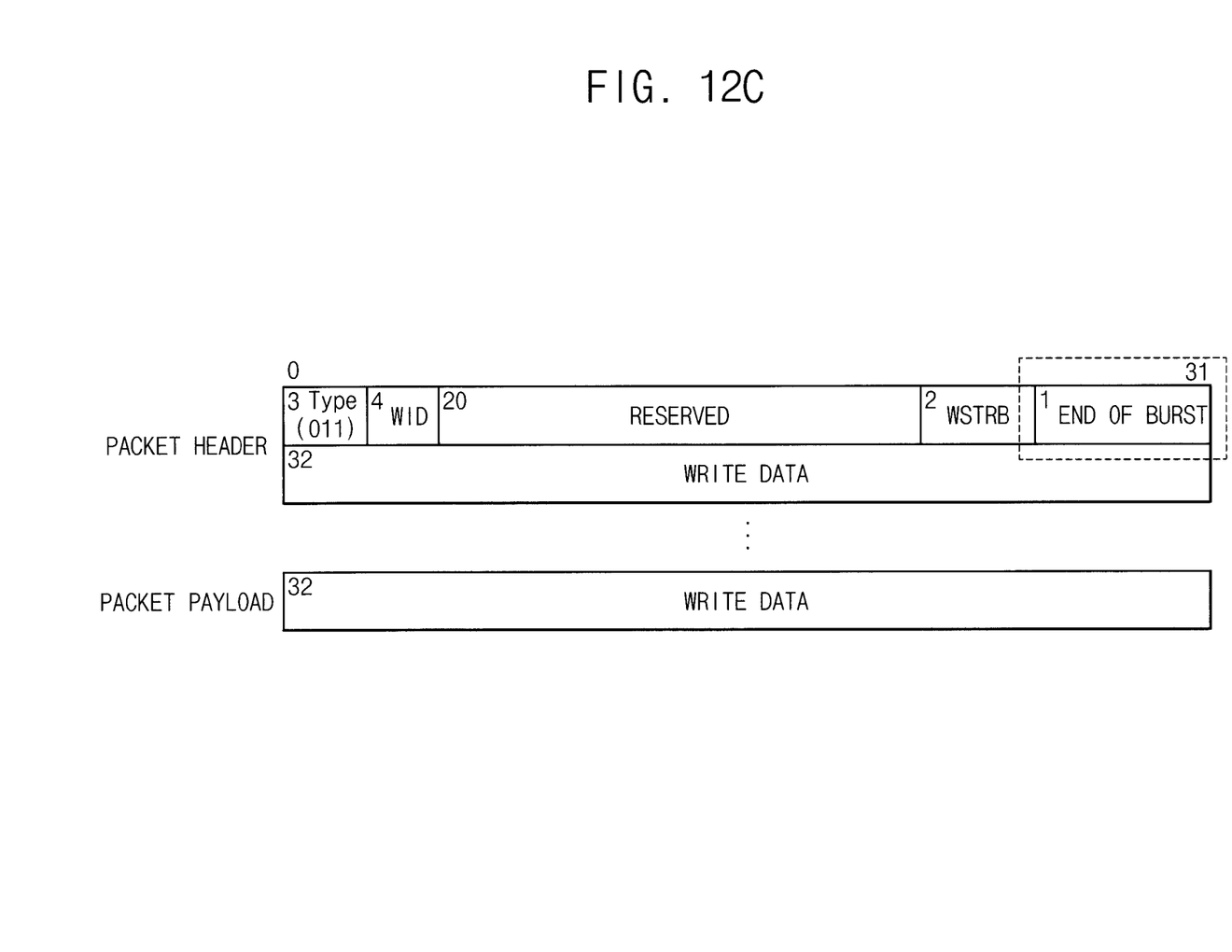

FIG. 12C shows a structure of a write data packet transmitted through the write data channel 140 in FIG. 3, according to an illustrative embodiment.

Referring to FIG. 12C, the packet header of the write data packet includes information regarding packet type (Type), identification of a slave device which is the object of the writing operation (WID), bits of a write strobe signal (WSTRB), and information relating to whether the burst is the last burst (END OF BURST). The packet payload includes write data.

Figure 12D:
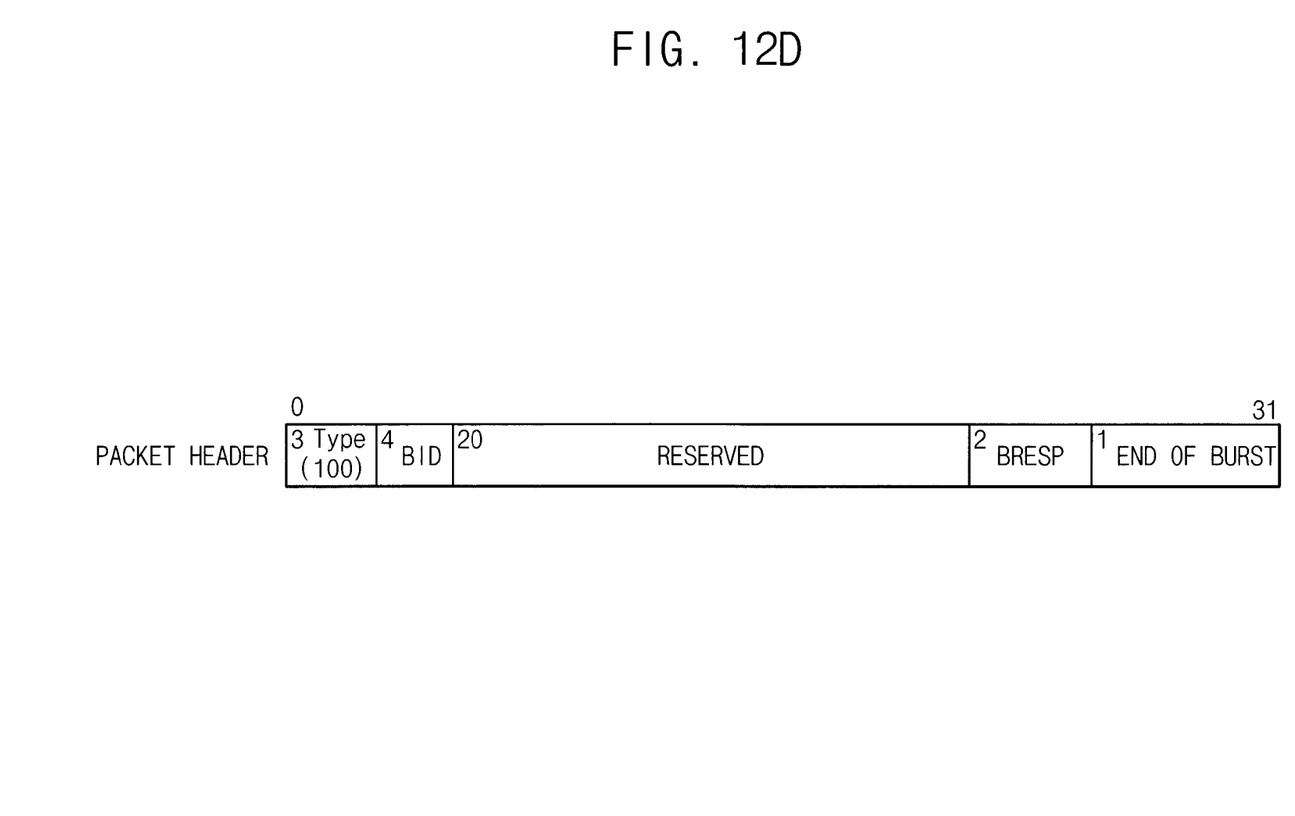

FIG. 12D shows a structure of a write response packet transmitted through the write response channel 150 in FIG. 3, according to an illustrative embodiment.

Referring to FIG. 12D, the write response packet includes only a packet header. The packet header includes information regarding packet type (Type), identification of a slave device which has responded (BID), information relating to whether the slave device has accepted the request (BRESP), and information relating to whether the burst is the last burst (END OF BURST).

The illustrative packets described with reference to the FIGS. 12A to 12D may apply to the illustrative transactions described with reference to FIGS. 6 and 7, as well. In addition, the packet headers may correspond to the head transactions in FIGS. 6 and 7, and the payloads may correspond to the remaining transactions in FIGS. 6 and 7.

As described above, according to various illustrative embodiments, the interface device and the system may increase QoS and operating frequency by swapping items based on the priorities. The interface device and the system according to various illustrative embodiments may be applied to system-on-chip (SoC).

The foregoing is illustrative of various embodiments, and is not to be construed as limiting thereof. That is, while the inventive concept has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. An interface device, comprising:
   a request queue comprising a plurality of elements configured to receive requests, including write requests and read requests, from at least one master device, respectively, and to indicate whether the requests are included in the elements using corresponding occupying bits; and
   a request queue manager configured to manage the request queue at least based on the occupying bits,
   wherein each of the requests included in the elements indicate a type of request as a write request or a read request.

2. The interface device of claim 1, wherein when a request from the at least one master device is a write request, an element designated by the write request stores corresponding write data, and when a request from the at least one master device is a read request, data stored in a first element is output as read data, and data stored in elements other than the first element are shifted to next elements.

3. The interface device of claim 1, wherein the request queue manager swaps at least part of items stored in the elements based on respective priorities of the requests.

4. The interface device of claim 3, wherein the request queue manager swaps the items stored in first odd elements and adjacent even elements during a first cycle of a clock signal based on the priorities of the requests, and the request queue manager swaps the items stored in the even elements and adjacent second odd elements during a second cycle of the clock signal based on the priorities of the requests.

5. The interface device of claim 4, wherein the request queue manager comprises:
   first priority comparators configured to compare the priorities of the requests stored in the first odd elements and the adjacent even elements and to output first swapping signals based on the comparisons, the first swapping signals determining whether the items stored in the first odd elements and the adjacent even elements are swapped.

6. The interface device of claim 5, wherein the request queue manager further comprises:
   second priority comparators configured to compare the priorities of the requests stored in the even elements and the adjacent second odd elements and to output second swapping signals based on the comparisons, the second swapping signals determining whether the items stored in the even elements and the adjacent second odd elements are swapped.

7. The interface device of claim 6, wherein the items stored in at least one of the first odd elements and the adjacent even elements are swapped in response to the first swapping signals, or the items stored in at least one of the even elements and the adjacent second odd elements are swapped in response to the second swapping signals.

8. The interface device of claim 7, wherein the items stored in the at least one of the first odd elements and the adjacent even elements are swapped when the swapping signal has a first logic level.

9. The interface device of claim 7, wherein the items stored in the at least one of the first odd elements and the adjacent even elements are not swapped when the swapping signal has a first logic level.

10. The interface device of claim 7, wherein the first priority comparators are configured to output the first swapping signals during the first cycle of the clock signal, and the second priority comparators are configured to output the second swapping signals during the second cycle of the clock signal.

11. The interface device of claim 4, wherein the request queue corresponds to a soft first-in first-out (FIFO) buffer, which includes the elements which are capable of being swapped with respect to each other.

12. The interface device of claim 1, wherein the request queue manager is configured to provide a status signal indicating a state of the request queue based on the occupying bits.

13. A system, comprising:
   a plurality of master devices configured to transmit a corresponding plurality of requests;
   a plurality of slave devices;
   an interconnect device configured to selectively connect the plurality of master devices and the plurality of slave devices with respect to each other,
   wherein the interconnect device comprises:
      an arbiter configured to generate an arbitration signal based on the requests from the master devices; and
      a routing unit configured to select one of the requests in response to the arbitration signal; and
   a plurality of slave interface devices, each slave interface device being connected between one of the slave devices and the interconnect device and configured to process data transmitted between at least one of the master devices and the slave device,
   wherein each slave interface device comprises:
      a request queue comprising a plurality of elements configured to receive corresponding requests from at least one master device of the plurality of master devices and to represent whether the corresponding requests are included using corresponding occupying bits; and
      a request queue manager configured to manage the request queue at least based on the occupying bits,
   wherein the arbiter is configured to generate the arbitration signal according to a round robin schedule.

14. The system of claim 13, wherein the master devices and the slave devices are installed in one chip.

15. A slave interface device, comprising:
   a request queue connected to an interconnect for receiving requests from at least one master device through the interconnect, the request queue comprising a plurality of elements, each element being configured to include a request from the at least one master device, an occupying bit indicating whether the request is included, and a priority indicating a priority of the request; and
   a request queue manager configured to manage the request queue at least based on the occupying bits and the priority of each of the elements.

16. The slave interface device of claim 15, wherein the request queue manager comprises:
   a plurality of first priority comparators configured to compare the priorities of the requests stored in first odd elements and adjacent even elements of the plurality of elements, and to output first swapping signals based on the comparisons, the first swapping signals determining whether items stored in the first odd elements and the adjacent even elements are swapped; and
   a plurality of second priority comparators configured to compare the priorities of the requests stored in the even elements and adjacent second odd elements of the plurality of elements, and to output second swapping signals based on the comparisons, the second swapping signals determining whether items stored in the even elements and the adjacent second odd elements are swapped.

17. The slave interface device of claim 16, wherein the plurality of first priority comparators output the first swapping signals during a first cycle of a clock signal, and the plurality of second priority comparators output the second swapping signals during a second cycle of the clock signal.

18. The slave interface device of claim 15, wherein the interconnect comprises an arbiter configured to generate an arbitration signal based on the requests from the at least one master device, and a routing unit configured to select one of the requests in response to the arbitration signal.

* * * * *